United States Patent [19]

Lehtonen

[11] Patent Number: 5,582,568
[45] Date of Patent: Dec. 10, 1996

[54] METHOD FOR COATING A ROLL AND A COATED ROLL FOR A PAPER MACHINE

[75] Inventor: Pentti S. Lehtonen, Jyväskylä, Finland

[73] Assignee: Valmet Corporation, Helsinki, Finland

[21] Appl. No.: 369,133

[22] Filed: Jan. 5, 1995

Related U.S. Application Data

[62] Division of Ser. No. 195,758, Feb. 14, 1994, Pat. No. 5,412,870.

[30] Foreign Application Priority Data

Feb. 11, 1993 [FI] Finland ................................. 930611

[51] Int. Cl.⁶ ........................................................ B23P 15/00
[52] U.S. Cl. ................................ 492/59; 492/30; 492/35; 492/36
[58] Field of Search ........................... 492/28, 29, 30, 492/35, 36, 59

[56] References Cited

U.S. PATENT DOCUMENTS

| | | | |
|---|---|---|---|
| 3,823,456 | 7/1974 | Schneider et al. | 29/895.32 |
| 4,094,707 | 6/1978 | Schrewe et al. | 29/895.32 |
| 4,258,089 | 3/1981 | Anderson et al. | 492/59 |
| 4,700,850 | 10/1987 | Michel | 29/527.2 |
| 5,023,985 | 6/1991 | Salo et al. | 492/59 |
| 5,089,201 | 2/1992 | Takahashi | 29/895.32 |
| 5,138,766 | 8/1992 | Kumura et al. | 29/895.32 |
| 5,167,068 | 12/1992 | Leino et al. | 29/895.32 |
| 5,187,849 | 2/1993 | Kobayashi | 492/59 |
| 5,188,273 | 2/1993 | Schmoock | 492/35 |
| 5,229,813 | 7/1993 | Cherian | 492/59 |
| 5,235,747 | 8/1993 | Leino et al. | 29/895.32 |
| 5,266,257 | 11/1993 | Kildune | 29/895.32 |
| 5,455,313 | 10/1995 | Kurusu et al. | 492/28 |

FOREIGN PATENT DOCUMENTS

| | | | |
|---|---|---|---|
| 8068514 | 4/1983 | Japan | 29/895.32 |
| 3258358 | 10/1988 | Japan | 492/30 |
| 4048767 | 2/1989 | Japan | 492/30 |
| 4314541 | 4/1991 | Japan . | |
| 1542988 | 1/1987 | U.S.S.R. . | |
| 2117486 | 10/1983 | United Kingdom | 29/893.32 |

*Primary Examiner*—Irene Cuda
*Attorney, Agent, or Firm*—Steinberg, Raskin & Davidson, P.C.

[57] ABSTRACT

A coated roll and a method for coating a roll used in a paper machine. Desired surface property values of the roll are fed into a central unit of the coating system and the roll is coated while following a function $f_1(x), f_3(x)$ created in the central unit over the distance of the length of the roll. A surface hardness and/or surface profile corresponding to the formed function $f_1(x), f_2(x)$ is derived which does not have any steps or other points of discontinuity. The roll is coated with a polymer, preferably polyurethane.

7 Claims, 6 Drawing Sheets

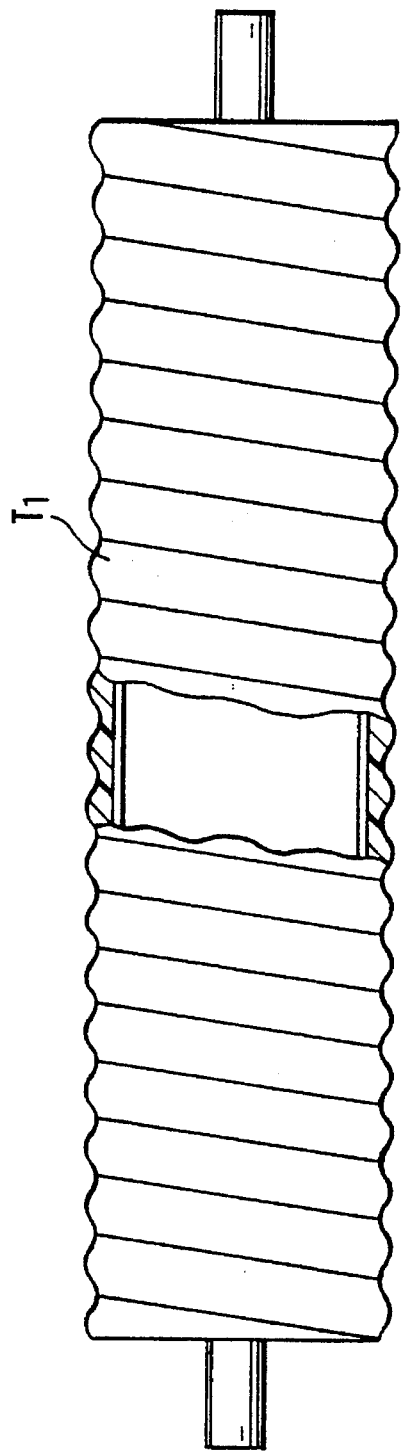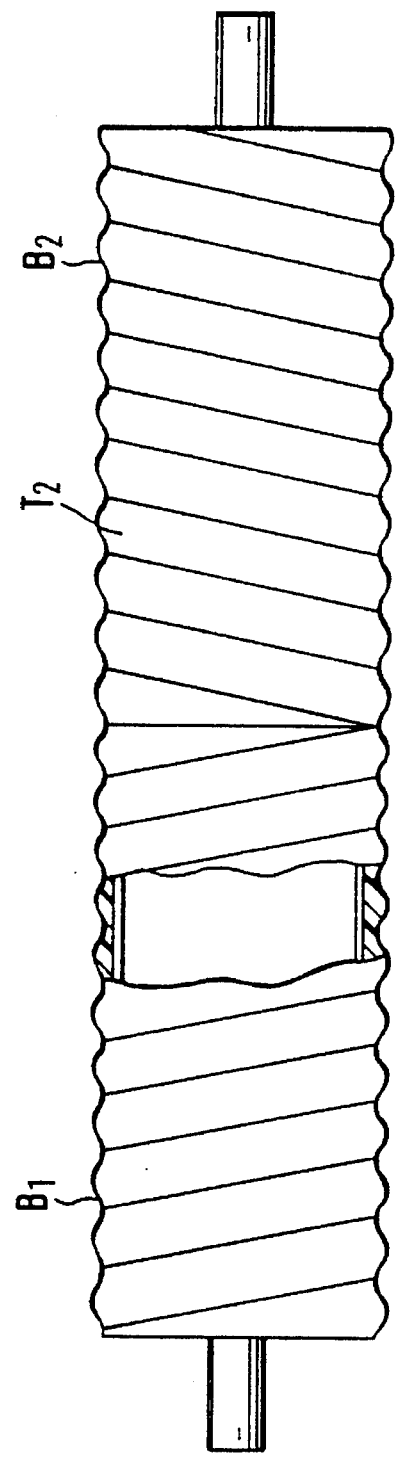
FIG.3A
FIG.3B

METHOD FOR COATING A ROLL AND A COATED ROLL FOR A PAPER MACHINE

This is a division of U.S. patent application Ser. No. 08/195,758, filed Feb. 14, 1994 now U.S. Pat. No. 5,412,870.

BACKGROUND OF THE INVENTION

The present invention relates to a method for coating a roll used in, e.g., a paper machine, and a coated roll for a paper machine.

In the prior art, a process for coating a roll with polyurethane by means of rotation casting is known. However, in the prior art processes, for the central unit of the coating system, a satisfactory method is not known in which the coating of a so-called shape-profiled and/or hardness-profiled roll can take place smoothly without discontinuities in the hardness or in the shape (thickness) of the coating.

OBJECTS AND SUMMARY OF THE INVENTION

It is an object of the present invention to provide a new and improved method for coating a roll and a coated roll in which the roll is provided with a shape profile and/or hardness profile without discontinuities in the hardness profile or shape profile of the roll.

It is another object of the present invention to cast a roll with a hardness profile and/or a shape profile (thickness) along the entire length of the roll when the hardness and shape are predetermined at three points. The shape profile is also referred to as the surface profile.

In the method in accordance with the present invention, at least three desired values of surface hardness/surface profile are fed into a central unit of the coating system as starting-value data before the polymer is cast onto the roll. The three desired values of surface hardness/surface profile are selected from points over the length of the roll, preferably at the ends of the roll and at a middle point of the roll. On the basis of the given starting values, the central unit, which is preferably a microprocessor, forms or derives a surface-property function $f_1(x), f_3(x)$, wherein $f_1(x)$ represents the desired surface hardness across the entire length of the roll and $f_3(x)$ represents the desired surface profile shape across the entire length of the roll. Thus, the function includes the given starting value points, for example at the three selected starting points.

In the present invention, the mathematical function $f_1(x), f_3(x)$ is formed whereby the first number corresponds to the value of function $f_1(x)$ at location (x), i.e., the hardness at that point, and the second number corresponds to the function $f_3(x)$ at the same location (x). Function $f_1(x), f_3(x)$ approximates a set of points of longitudinal position (x-axis) versus surface hardness and surface profile of the roll (y-axis). Preferably, the function $f_1(x), f_3(x)$ is a polynomial function and can be a function of the second or third degree, or even a higher degree.

The function $f_1(x)$ is formed in the central unit on the basis of the starting-value data entered into the central unit. When three starting-value data points are used, the set of points can be approximated by means of a parabola. The variables of the parabola passing through the starting-value points are obtained when a group of equations is formed from the points and this group is solved numerically, e.g., by means of Cramer's rule.

The surface-hardness function $f_1(x)$ that was formed cannot be used directly for controlling the casting machine since it relates the position along the length of the roll (x) to the hardness at that point. Therefore, a second function $f_2(x)$ is formed, which is a mix-ratio set-value function and determines the set value corresponding to the desired hardness at each point along the length of the roll, i.e., the mix ratio for which the desired hardness is obtained.

During the casting process, the profile form of the roll face can be regulated by any number of ways which can be applied individually or in combination with one another. For example, the regulation of the profile form can be achieved by regulating the flow quantity of the polymer applied from the casting nozzle, regulating the speed of rotation of the rotated roll, and/or regulating the movement of the casting nozzle in the axial direction of the roll.

If it is desired to provide a crown on a roll, the crown can be produced in the manner mentioned above by regulating the profile of the roll face. An operational crown of the roll can also be produced by varying only the hardness of the coating over the length of the roll so that the shape profile of the roll remains straight, i.e., invariable, when the roll face is unloaded. When the roll is coated so that the hardness of the roll is at the maximum in the middle area of the roll and at the minimum in the lateral areas of the roll, the roll face yields more in the lateral areas of the roll in a loading situation and, thus, in a loaded situation, the desired crown form, e.g., a positive crown, is obtained. The casting is carried out expressly so that the end areas of the roll are the softest points, whereas there is a maximum hardness at the middle of the roll.

By means of the method in accordance with the present invention, it is also possible to produce operational negative crown in a similar manner as the positive crown described above is produced.

In a preferred embodiment, grooves are provided on reel spools so that it is possible to prevent formation of air bags between the paper web running over the roll and the reel face. In prior art manufacturing techniques, the surface coating was first ground, and the grooves were then machined mechanically. In contrast to the prior art, by means of the method in accordance with the present invention, the face and the grooves are formed in one casting step by bringing the casting head into a certain movement in the direction of the central axis (x) of the roll and by giving the threading a certain pitch. In order that the shape of the spiral profile should remain in the desired form, the mix ratio used to cast the roll is given a specific recipe to achieve rapid hardening of the coating so that the hardening time is only about 1 second to about 3 seconds. The reaction can be accelerated, in the case where polyurethane is used to coat the roll, by increasing the proportion of diamine in the mix. By reducing the reaction time, the hardening is accelerated and deformation of the cast spiral is prevented. The grooves produced by means of the method operate efficiently as air-removing ducts. It is further unnecessary to impose strict requirements on the shape on the groove form.

In the method in accordance with the present invention, the desired surface property values at least at three points over the length of the roll are fed into the central unit of the system, and a mathematical function $f_1(x), f_3(x)$ is formed in the central unit that approximates the given set of points. The roll is coated in accordance with the function $f_1(x), f_3(x)$ created in the central unit over the distance of the length of the roll, whereby a surface hardness or surface profile corresponding to the formed function $f_1(x), f_3(x)$ can be formed which has no discontinuous steps or other points of discontinuity since the function does not have any points of discontinuity.

Further, in accordance with the invention, the roll coated with a polymer, such as polyurethane, has a face with a wave-shaped form produced from a mix of the polymer extruded from a casting head onto the roll. The mix of the polymer has a reaction or hardening time in a range of about 1 second to about 3 seconds to allow the wave-shaped form to harden. The wave-shaped form may be spiral-shaped from a first end of the roll to a second end of the roll. Alternatively, the wave-shaped form may be spiral-shaped in a direction from a middle area of the roll to both ends of the roll, the spiral being right-handed on one half of the roll and left-handed on the other half of the roll.

The roll coated with a polymer, such as polyurethane, in accordance with the invention may have a continuous surface profile shape in the form of a crown. The surface profile shape is produced by reading a continuous function which represents the profile of the roll face across the length of the roll. The coating may also have a continuous hardness which varies smoothly from one end of the roll to an opposite end of the-roll such that there are no steps or points of discontinuity in the hardness of the roll. For a positive crown, a maximum value of the hardness of the roll coating is in a middle area of the roll and minimum values of the hardness of the roll coating are at both ends of the roll. For a negative crown, a minimum value of the hardness of the roll coating is in a middle area of the roll and maximum values of the hardness of the roll coating are at both ends of the roll.

In the following, the invention will be described in detail with reference to some exemplifying embodiments of the invention illustrated in the figures in the accompanying drawings. However, the present invention is by no means strictly confined to the details of these embodiments.

BRIEF DESCRIPTION OF THE DRAWINGS

The following drawings are illustrative of embodiments of the invention and are not meant to limit the scope of the invention as encompassed by the claims.

FIG. 3A shows a first preferred embodiment of a coated roll in accordance with the present invention.

FIG. 3B shows a second preferred embodiment of a coated roll in accordance with the present invention.

DETAILED DESCRIPTION OF THE INVENTION

Figure 1:
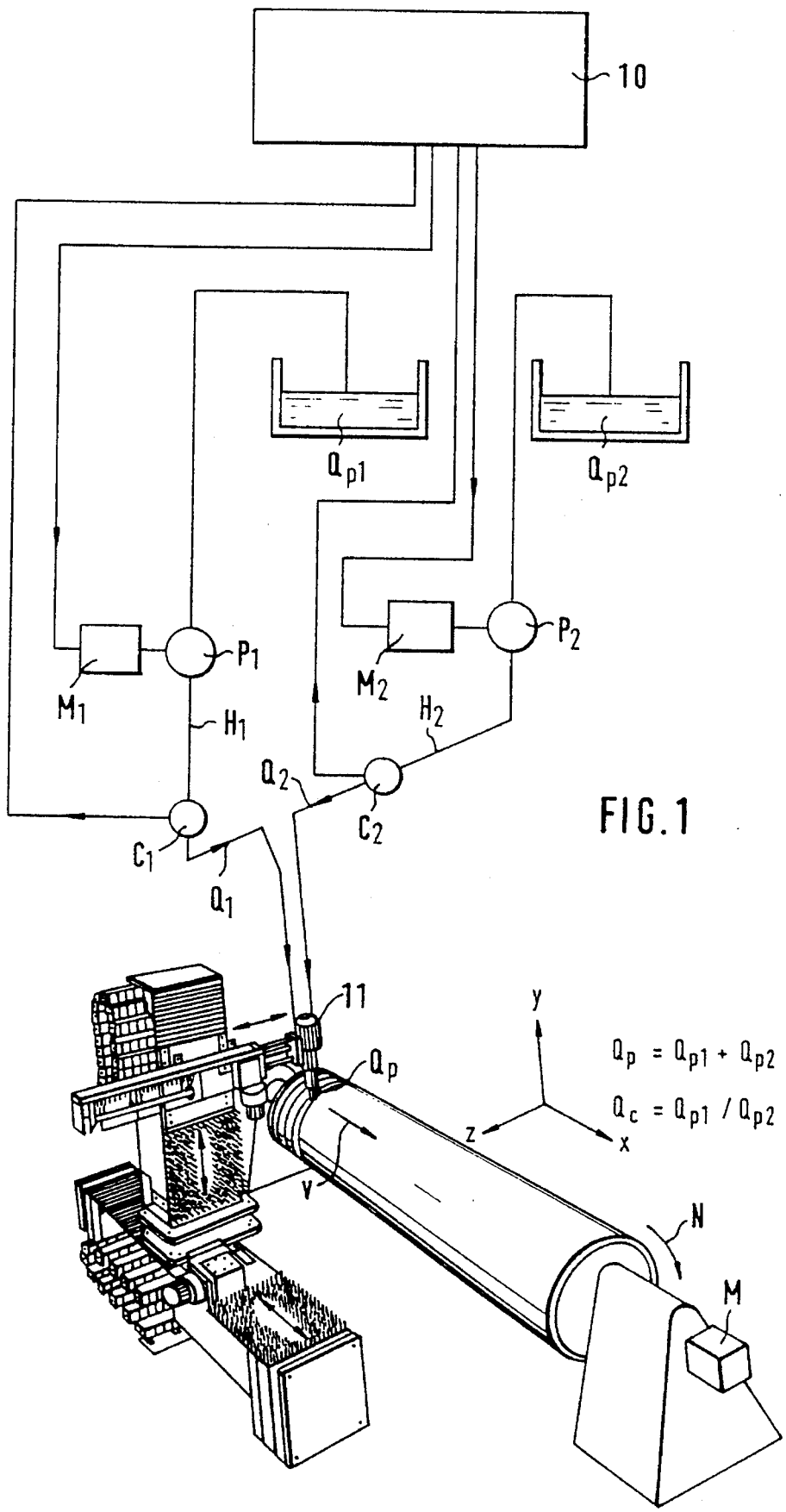
FIG. 1 illustrates the system of regulation used in the method for coating a roll and to produce a coated roll in accordance with the present invention.

FIG. 1 illustrates a roll coating system in accordance with the present invention. The coating system comprises a central unit 10 into which the desired properties from at least three points along the length of the roll are fed as starting-value data. The central unit 10 may be a microprocessor. Preferably, the surface property data (surface-hardness data/ profile data) are given from both ends of the roll and from a point in the middle area of the roll. However, the points may be any three or more points along the length of the roll.

In the invention, based on the set of points given as the starting values (position of length on the roll-value of hardness of the roll surface; position of length on the roll-profile shape of the roll), the central unit 10 forms a mathematical function that represents a property of the surface. The function is formed advantageously, e.g., by means of Cramer's numerical method. When three points are given as the starting data, preferably a polynomial function which may represent a parabola is formed. The variables in the parabola are obtained when a group of equations is formed on the basis of the starting-value data and when this group of equations is solved (by Cramer's method). Thus, based on the given starting-value data, the central unit 10 forms a function $f_1(x), f_3(x)$ which represents the variation in the desired surface hardness/surface profile form across the length of the roll T.

If the surface hardness changes, the function $f_1(x)$ is not sufficient alone to determine the hardness of the roll, because the hardness value that is obtained cannot be used directly for the control of the casting machine. The control value corresponding to the desired hardness can be determined by means of a conversion function $f_2(x)$. By means of the function $f_2(x)$, the hardness values at eachpoint (x) determined from function $f_1(x)$ is converted to a mix ratio (recipe), and by means of the mix ratio for each point (x), the desired hardness is achieved.

As shown in FIG. 1, for the sake of example only, the flow of the mix $Q_p$ coming out of the casting head 11 is denoted by reference character Q, and the flows of the components of formation $Q_{p1}$ and $Q_{p2}$ of the mix $Q_p$ are represented by reference characters $Q_1$ and $Q_2$, respectively. Notwithstanding the illustrated embodiment, it is understood that there may be a large number of components of formation $Q_{p1}, Q_{p2}, \ldots, Q_{pn}$ of the mix $Q_p$. When the surface hardness is regulated across the length of the roll, the central unit 10 gives set values for the flow Q of the mix $Q_p$ coming out of the casting head 11 and for the pumps $P_1, P_2$ which control the flows $Q_1, Q_2$ of the components of formation $Q_{p1}$ and $Q_{p2}$ of the mix $Q_p$. The pumps $P_1, P_2$ are regulated by regulating the speeds of rotation of the motors $M_1, M_2$ that rotate the pumps. Flow meters $C_1, C_2$ are arranged after the pumps $P_1, P_2$, respectively. Measurement values from the flow meters are transferred back to the logic means of the central unit, which compare the measured values $Q_{1M}, Q_{2M}$ from the flow meters with the values $Q_1, Q_2$ given as starting data. If the values do not correspond to one another, the central unit gives new settings to the pumps $P_1, P_2$, to constitute a feedback system.

In the process for coating a roll, as the variables it is possible to consider the quantity $Q_p$ of flow of polymer from the casting head 11 onto the face of the roll T, the speed of rotation (N) of the roll T to be coated, the speed (v) of movement of the casting head 11 in the axial direction of the roll to be coated (direction X), and the mix ratio/recipe $Q_{p1}/Q_{p2}$ of the polymer, which is preferably polyurethane. The recipe, as hereinafter used, means the proportions of percentage with which each mix component is represented in the ultimate mix $Q_p$.

In rotation casting, the casting head 11 is displaced along the face of the roll T in the axial direction (x) of the roll, while the roll T is rotated at the same time. As the casting head progresses along the length of the roll, a new hardness value is updated, e.g., at intervals of 50 ms, from the function $f_1(x), f_2(x)$ formed in the central unit 10, and the recipe $Q_{p1}, Q_{p2}$ that carries the hardness value into effect is executed by means of new set values given to the pumps $P_1, P_2$. The regulation of the pumps $P_1, P_2$ can take place, e.g., by varying the speeds of rotation of the pumps by means of frequency converters.

Figure 2A:
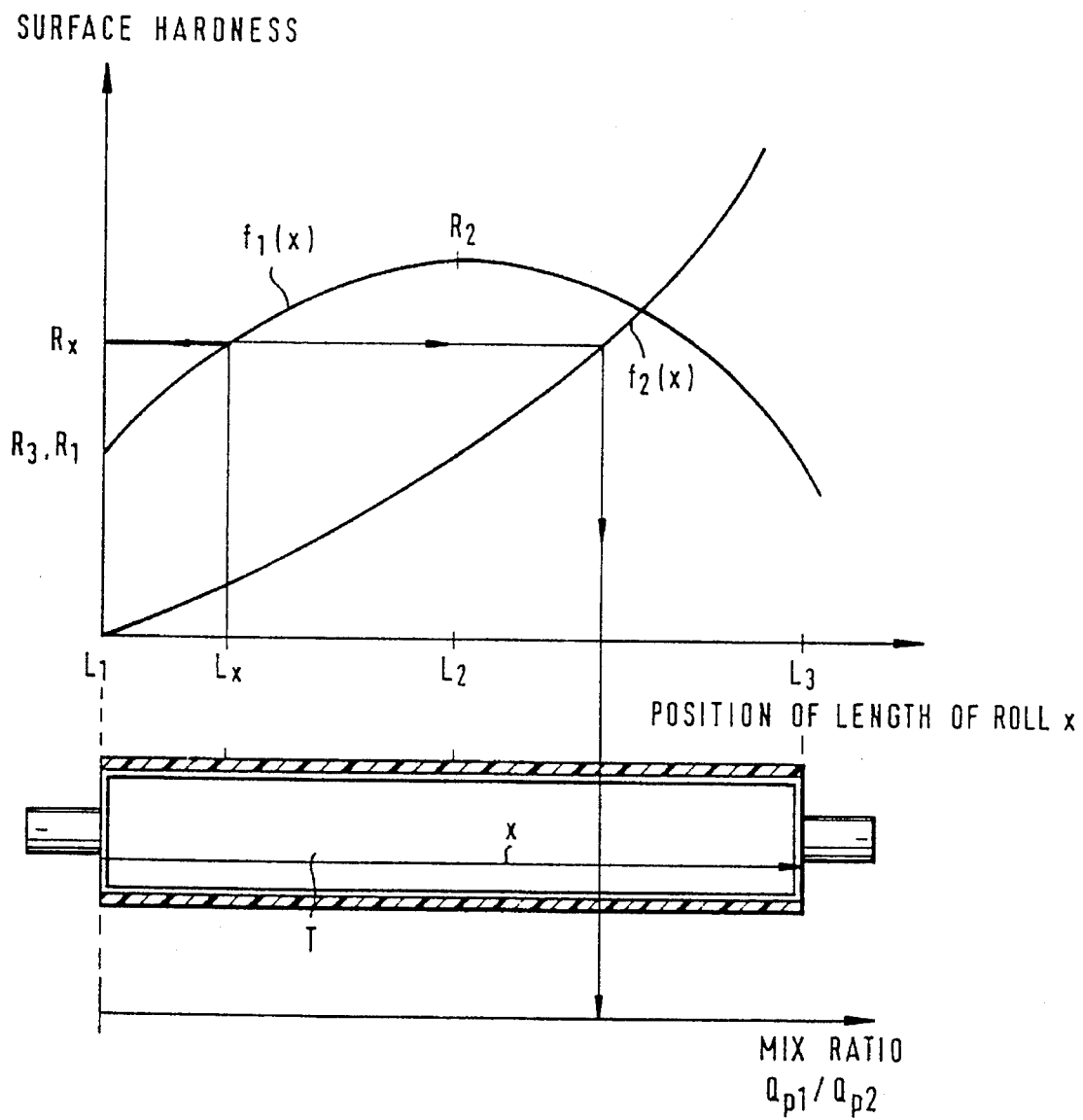
FIG. 2A illustrates the regulation of the surface hardness of the roll by means of the functions $f_1(x)$ and $f_2(x)$.

FIG. 2A illustrates the regulation of the surface hardness of the roll by using the functions $f_1(x), f_2(x)$ for the control criteria. As shown in FIG. 2A, the coating of the roll is started by casting from one end of the roll and rotating the roll T at the speed of rotation N and displacing the casting head 11 in the axial direction (direction X) of the roll T. The flow quantity of the polymer $Q_p$ coming out of the casting head 11 is denoted with Q.

In FIG. 2A, the steps of the method in accordance with the present invention are illustrated. The desired hardnesses in the middle area ($R_2$) of the roll and at the ends ($R_1, R_3$) of the roll have been given as starting-value data to the central unit 10. The hardness at the beginning of the roll $R_1$ has been selected to be equal to the hardness at the end of the roll $R_3$; however, this is not required. On the basis of the set of points $L_1, R_1$; $L_2, R_2$; $L_3, R_3$, a group of equations is formed and solved numerically by Cramer's method, whereby, to approximate the above set of points, a function $f_1(x)$ is obtained, which passes through the starting-value points and is a polynomial function, preferably a parabola. As a polynomial, the function is continuous and smooth, and the hardness values of the face of the roll T can be read from all points along the length of the roll. It is important to note that jumps and discontinuities in the hardness values do not occur. After the function $f_1(x)$ is created by the central unit or microprocessor 10, in the memory of the central unit, the control system starts reading the function $f_1(x)$ from one end of the roll T in a direction to the opposite end of the roll. The system reads a new hardness value, e.g., at intervals of 50 ms, and in this way the hardness is varied continuously.

FIG. 2A shows the function $f_1(x)$ by whose means the desired hardness value R(x) can be read. On the basis of the hardness value R(x), a transfer or mapping takes place to the set-value function $f_2(x)$. By means of the function $f_2(x)$, it is possible to read the mix ratio $Q_c = Q_{p1}/Q_{p2}$, with which the hardness read from the function $f_1(x)$ is carried into effect to provide the correct components to achieve that hardness at the location (x). In FIG. 2A, the method mentioned above and the reading and the direction of reading of the functions $f_1(x), f_2(x)$ are illustrated by means of arrows. Within the scope of the invention, such an embodiment is also possible in which both the surface hardness and the surface profile are regulated at the same time.

Figure 2B:
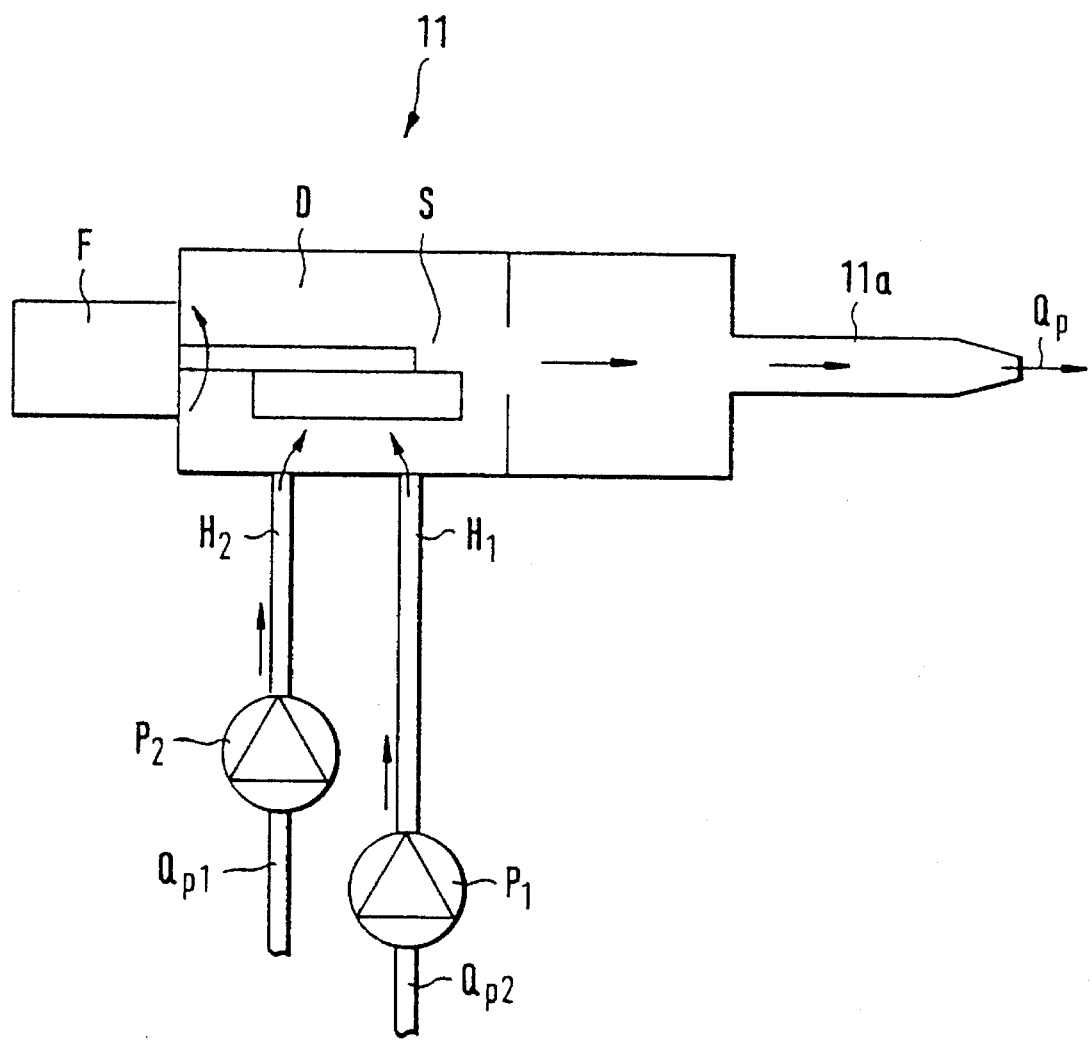
FIG. 2B shows a construction of a casting head used in the present invention.

FIG. 2B shows the casting head 11 used in the rotation casting of a roll face in accordance with the present invention, for the arrangement of application of the coating material of two or more components. Ducts $H_1$ and $H_2$ pass into the casting head 11 and the ducts are further connected with pump devices $P_1, P_2, \ldots$. The different components $Q_{p1}, Q_{p2}, \ldots, Q_pn$ are passed into the ducts $H_1, H_2, \ldots, H_n$. There may be several components $Q_{p1}, Q_{p2}, \ldots$. The components are passed into a mixing chamber D in the casting head 11. The mixing chamber comprises a mixing device S having a shaft which revolves at a high speed. By means of the pressure produced by the pump devices $P_1$ and $P_2$, the mixed polymer mix is cast out of the nozzle head 11a and directly onto the roll face.

As the coating material, it is possible to use, e.g., a two-component coating material $Q_{p1}, Q_{p2}$ which comprises a hardener component $Q_{p1}$ and a plastic raw material mixture component $Q_{p2}$. When polyurethane is used, the polyurethane comprises an isocyanate component $Q_{p1}$ and a polyol component $Q_{p2}$.

It is preferable to obtain a short hardening time for the coating. The hardening or reaction time can be regulated, e.g., in polyurethane coating by using, e.g., a diamine component $Q_{p3}$ and by adjusting its proportion in the mix. If the proportion of the diamine component $Q_{p3}$ in the mix is increased, the reaction time of the mix is shortened, i.e., the hardening speed of the mix is increased. Normally the hardening speed is in a range from about 5 seconds to about 9 seconds. When the method of the present invention is used and when a wave-shaped surface profile form of a certain pitch is produced, it is preferable that the hardening time should be in the range of only from about 1 second to about 3 seconds in order that the profile form obtained should harden quickly, so that it should not have time to become smooth before hardening.

FIG. 3A shows a first preferred profile shape of the coating of the roll $T_1$ in accordance with the present invention. The profile shape is produced by displacing the casting head in the axial direction of the roll at a certain speed (v) in order that the spiral in the coating should have a certain desired pitch. The desired pitch for the spiral is achieved by shifting the casting head 11, i.e., by shifting the sledge of the casting head 11, in the axial direction of the roll during each revolution of the roll. The transfer distance of the sledge per revolution of the roll may be a distance equal to, or smaller than, the width of the bead of mix extruded from the casting head 11.

When an admixture that increases the hardening speed is added to the coating material, it is possible to provide the effect that the cast bead receives a wave form and is not smooth. The wave form of the extruded mix can also be affected by regulating the flow speed of the mix $Q_p$ flowing out of the casting head 11 and/or, in rotation casting, by regulating the speed of rotation N of the coated roll. The desired cast form is obtained in polyurethane coating by also using a component $Q_{p3}$ in addition to components $Q_{p1}, Q_{p2}$. Component $Q_{p3}$ is, for example, a diamine, by means of whose addition the reaction time is reduced so that the hardening takes place, for example, even in one second. Normally the reaction time is about 5 seconds to about 9 seconds.

The form of the spiral can be influenced by increasing or reducing the flow speed $Q_1$ from the casting head 11. Thus, the polyurethane is shaped with ridges, in which case grooves are formed between the ridges. The grooves pass in spiral shape from end to end across the roll. The coating shown in FIG. 3A is suitable, e.g., for reel spools. By means of the grooves on the reel spools, it is possible to prevent formation of air bags between the paper web and the spool face. The grooves operate as air-removing ducts, so that it is unnecessary to impose strict requirements of shape on the groove form. The prior art process of grinding the face of the roll with subsequent mechanical formation of the grooves is not needed.

In FIG. 3B, a second preferred profile shape of a coating on roll $T_2$ in accordance with the present invention is illustrated. In this embodiment, the coating on the roll is started from the middle. First, the half $B_1$ of the roll area has been prepared, and thereupon the other half $B_2$ of the roll is coated. Thus, the spiral runs as right-handed from the middle area of the roll toward one end of the roll and as left-handed from the middle area of the roll toward the opposite end of the roll. The spiral in FIG. 3B has been produced in a way similar to that described in FIG. 3A. Only the directions of movement of the sledge and the point of starting of the coating from the middle of the roll are different than those in the embodiment shown in FIG. 3A. By means of the formation of the profile, a surface form is obtained by whose means the web is spread towards both sides or ends of the roll. Moreover, in the embodiment of FIG. 3B as in the embodiment of FIG. 3A, the grooves act as air-removing ducts and prevent the formation of air bags between the paper web and the roll.

Figure 3C:
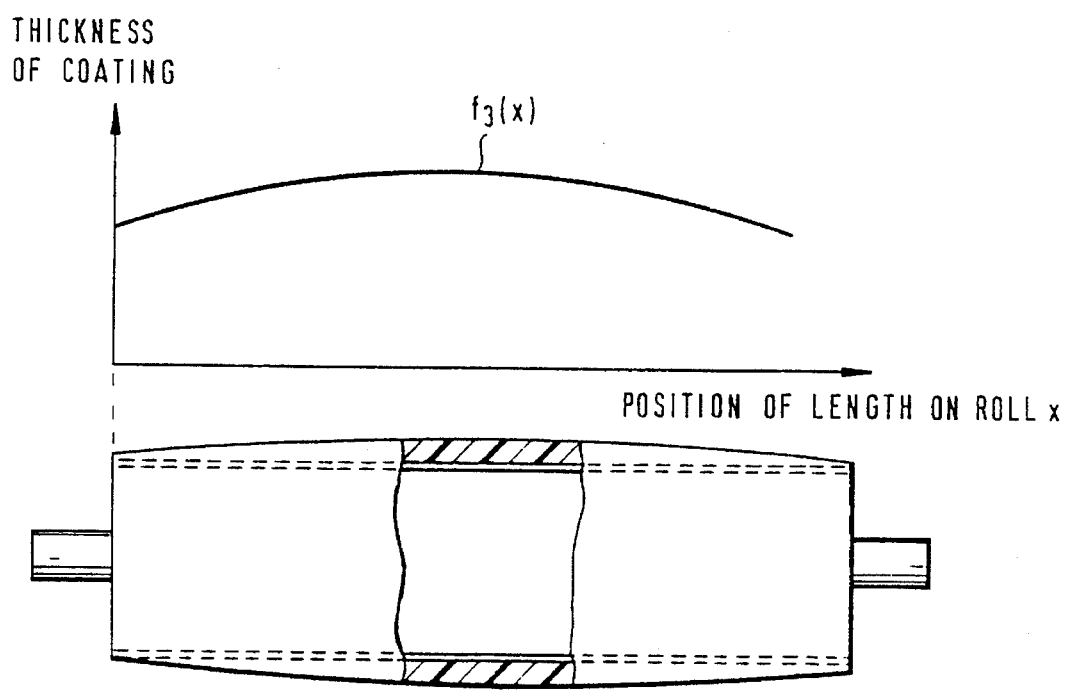
FIG. 3C shows a third preferred embodiment of a coated roll in accordance with the present invention.

FIG. 3C illustrates a crown form of the roll $T_3$ face produced by means of the method in accordance with the present invention, wherein the profile of the face is varied smoothly across the entire length of the roll. The profile shape is produced by varying the quantity of flow $Q_p$ of the polymer coming out of the casting head by means of the surface profile function $f_3(x)$ formed on the basis of the starting values. The desired surface form can also be obtained by varying the speed of movement of the casting head 11 in the axial direction of the roll and/or by varying the speed of rotation of the roll.

Figure 3D:
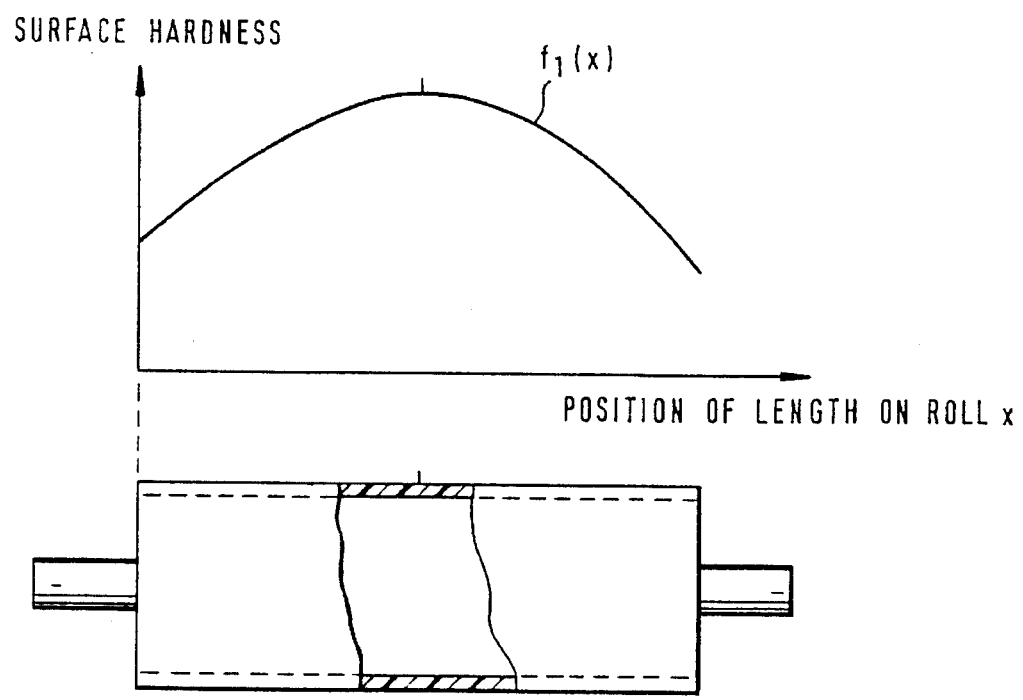
FIG. 3D shows a coating in which the face is straight across the entire distance of the roll length and the hardness of the roll coating varies over the distance of the roll, reaching a maximum in the middle area of the roll.

FIG. 3D illustrates a coating of roll $T_4$ in which the roll face is straight in the unloaded state across the entire length of the roll $T_4$, i.e., constant profile, whereas the hardness of the roll coating varies across the length of the roll so that its maximum value is placed in the middle area of the roll and the minimum values at the ends of the roll. By means of the variation in the hardness profile, an operational crown formation is obtained. When the roll is loaded, the lateral areas of the roll yield more than the middle areas of the roll. In this way, the desired crown form is obtained expressly in the loaded state of the roll $T_4$.

Figure 3E:
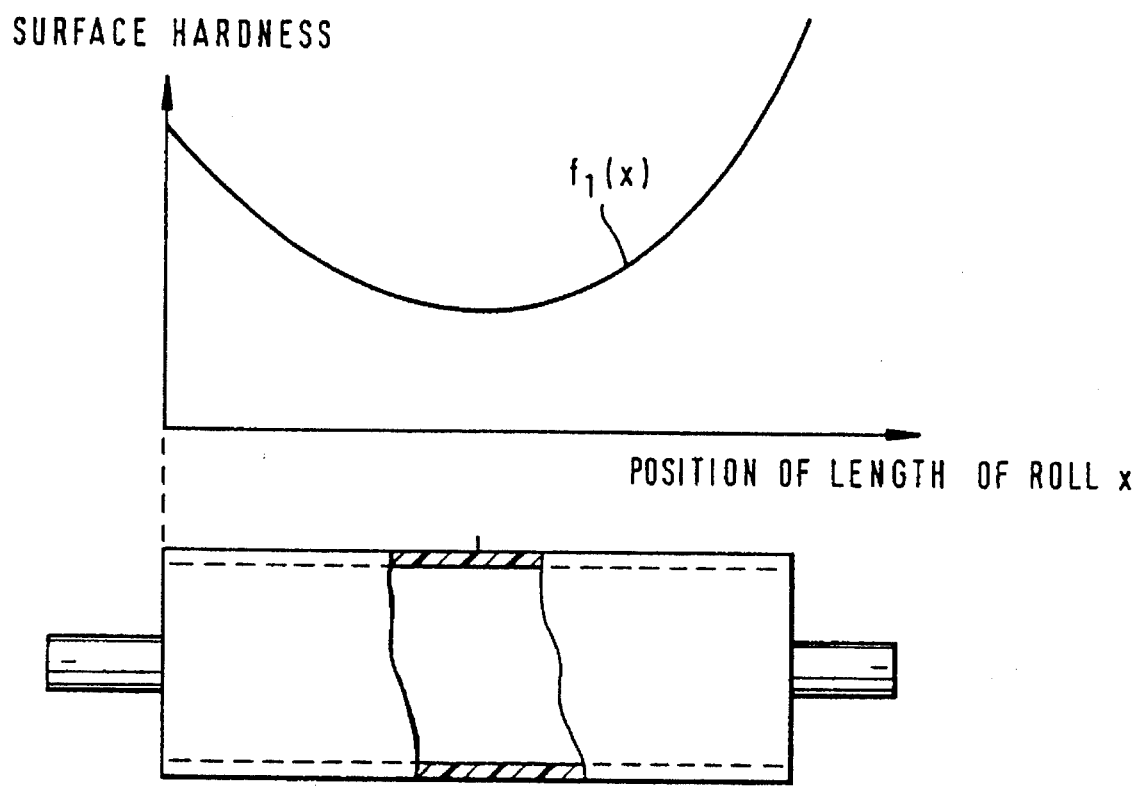
FIG. 3E illustrates an embodiment of a roll in accordance with the present invention, in which the roll comprises a coating by whose means an operational negative crown has been formed, i.e., in which the maximum hardness of the coating occurs at both ends of the roll and the minimum hardness in the middle area of the roll so that, in the unloaded state, the surface profile shape of the roll is straight.

Referring to FIG. 3E, by means of the method of the present invention, it is also possible to obtain a negative crown form, in which case such a function $f_1(x)$ is formed which has a minimum hardness in a middle area of the roll $T_5$ and the maximum hardness at both end areas of the roll $T_5$.

FIG. 3E shows then embodiment of the invention in which the roll $T_5$ has a negative crown form. In such a case, the maximum hardness in the roll $T_5$ face is placed at both ends of the roll and the minimum hardness in the middle area of the roll $T_5$. The function $f_1(x)$ is formed in a way corresponding to that described with respect to positive crown form, but the starting-value data differ from those given earlier so that the starting-value data of maximum hardness are now at both ends of the roll and the starting-value data of minimum hardness in the middle area of the roll. In the unloaded state, the roll face is straight. When the face is loaded, the coating yields more in the middle area of the roll than at the ends of the roll.

The examples provided above are not meant to be exclusive. Many other variations of the present invention would be obvious to those skilled in the art, and are contemplated to be within the scope of the appended claims.

I claim:

1. A paper machine roll comprising a cylindrical base having an outer surface and a polymer coating layer extending over the outer surface of said base and having an outer web-contacting surface, said outer surface having a wave-shaped form produced from a mix of the polymer extruded from a casting head onto the roll, the mix of the polymer having a reaction or hardening time from about 1 second to about 3 seconds to allow the wave-shaped form to harden.

2. The paper machine roll of claim 1, wherein the wave-shaped form is spiral-shaped from a first end of the roll to a second end of the roll opposite to said first end.

3. The paper machine roll of claim 1, wherein the wave-shaped form is spiral-shaped in a direction from a middle area of the roll to both ends of the roll, the spiral being right-handed on one half of the roll and left-handed on the other half of the roll.

4. A paper machine roll comprising a cylindrical base having an outer surface and a polymer coating layer extending over the outer surface of said base and having an outer web-contacting surface, said outer surface having a continuous surface profile shape in the form of a crown, said surface profile shape being produced in accordance with a continuous function which represents the profile of the roll face across the length of the roll.

5. A roll having a polymer coating layer having an outermost exposed surface adapted to operatively engage with a web, said coating having a continuous hardness which varies smoothly from one end of the roll to an opposite end of the roll such that there are no steps or points of discontinuity in the hardness of the roll, a maximum value of the hardness of the roll coating being in a middle area of the roll and minimum values of the hardness of the roll coating being at both ends of the roll such that an operational positive crown form is provided in the roll.

6. A roll having a polymer coating layer having an outermost exposed surface adapted to operatively engage with a web, said coating having a continuous hardness which varies smoothly from one end of the roll to an opposite end of the roll such that there are no steps or points of discontinuity in the hardness of the roll, a minimum value of the hardness of the roll coating being in a middle area of the roll and maximum values of the hardness of the roll coating being at both ends of the roll such that an operational negative crown form is provided.

7. The paper machine roll of claim 1, wherein said coating layer has a continuous hardness which varies smoothly from one end of the roll to an opposite end of the roll such that there are no steps or points of discontinuity in the hardness of the roll.

\* \* \* \* \*